United States Patent [19]

Simpson

[11] 4,088,433
[45] May 9, 1978

[54] EXTRUSION DIE

[75] Inventor: Howard D. Simpson, Irvine, Calif.

[73] Assignee: Union Oil Company of California, Los Angeles, Calif.

[21] Appl. No.: 772,150

[22] Filed: Feb. 25, 1977

[51] Int. Cl.² .............................................. B29F 3/04
[52] U.S. Cl. ................................. 425/464; 425/382 R
[58] Field of Search ........... 264/176 F, 176 R, 177 F, 264/177 R; 425/463, 464, 382, 382.2, 378 S, 379 S, 72 R, 72 S; 259/191, 193; 72/253 R, 261, 271; 137/101, 599, 561 A

[56] References Cited
FOREIGN PATENT DOCUMENTS 755,342  9/1933  France .................................. 425/464
1,284    2/1966  Japan ................................... 425/464

Primary Examiner—Francis S. Husar
Assistant Examiner—Mark Rosenbaum
Attorney, Agent, or Firm—Gregory F. Wirzbicki; Richard C. Hartman; Lannas S. Henderson

[57] ABSTRACT

An extrusion die having a plurality of orifices arranged therein so that the number of orifices per unit area in the plane of the external die face is larger near the periphery of the die face than near the center thereof provides for the extrusion of material through all the die orifices at a relatively uniform linear velocity.

15 Claims, 3 Drawing Figures

EXTRUSION DIE

BACKGROUND OF THE INVENTION

1. Field of the Invention

This invention relates to extrusion dies for extruding material through a plurality of die orifices. It especially relates to extrusion dies for extruding catalytic mix materials into catalyst particles of uniform size and shape.

2. Prior Related Art

In many commercial applications, catalysts are relied upon to aid in accelerating or inhibiting chemical reactions. Oftentimes, the catalysts are produced by passing a suitable catalytic mix material through an extrusion machine incorporating an extrusion die having a plurality of die orifices therein of equivalent cross-sectional area and of the same cross-sectional shape. The catalytic material extruded through such a die is forced out of the orifices in streams of extrudate. These streams are subsequently cut at uniform time intervals to produce catalyst particles, which are herein termed catalyst extrudates.

In most commercial applications, catalyst extrudates are used in the form of packed beds. However, it has been found that the pressure drop through a bed of catalyst extrudates can be reduced by making the extrudates of uniform size and shape. But as presently produced on a commercial scale, catalyst extrudates are of varying sizes, primarily because the catalytic mix material processed through commercial extrusion machines does not pass through all of the die orifices at the same rate. The linear velocity of material extruded through the orifices in the central portion of an extrusion die is greater than that of the material extruded through the orifices near the periphery thereof. This result is largely due to the laminar flow characteristics of the catalytic mix material just prior to extrusion through the die. Because of this difference in linear velocities, when all the extruded material is cut at a specified distance from the external die face at uniform time intervals, the catalyst extrudates produced from material that originally passed through orifices in the central portion of the die will necessarily be longer than those produced from material that originally passed through the orifices near the periphery.

Accordingly, it is a specific object of this invention to provide a die having orifices arranged therein such that the extrusion material will pass through all the orifices at an essentially uniform linear velocity.

SUMMARY OF THE INVENTION

In accordance with this invention, catalytic mix materials are passed through an extrusion die having a higher orifice density near its periphery than near its center. (As used herein, the term "orifice density" refers to the number of orifices extending through a die per unit area in a defined area of the external die face. For purposes of calculation herein, the number of orifices in a defined area of the external die face includes the fractional portions of orifices situated within said defined area.) As broadly defined, the extrusion die of the invention has a number of orifices therein of equal cross-sectional area in the plane of the external die face, which orifices are arranged such that the orifice density in any first circle, drawn on the die face so as to fully encompass no more than 90% of the orifices, and be defined by a first radius originating at the center of the die, and being of length equal to ⅛ inch multiplied by a positive integer greater than 1, is larger than the orifice density in a concentric second circle, also drawn on the die face, but being defined by a second radius smaller than said first radius but of length equal to ⅛ inch multiplied by a positive integer.

The arrangement of the orifices in the extrusion dies herein is designed to compensate for the velocity differences in different portions of the laminar-flowing material when it contacts the internal die face. That portion of the material moving most rapidly encounters high resistance in passing through the central die portion due to the presence of a low orifice density therein while the material moving least rapidly encounters low resistance in moving through the peripheral die portion having a higher orifice density than said central portion. Hence, material will be extruded through all of the die orifices at an essentially uniform linear velocity.

DETAILED DESCRIPTION OF THE INVENTION

Figure 1:
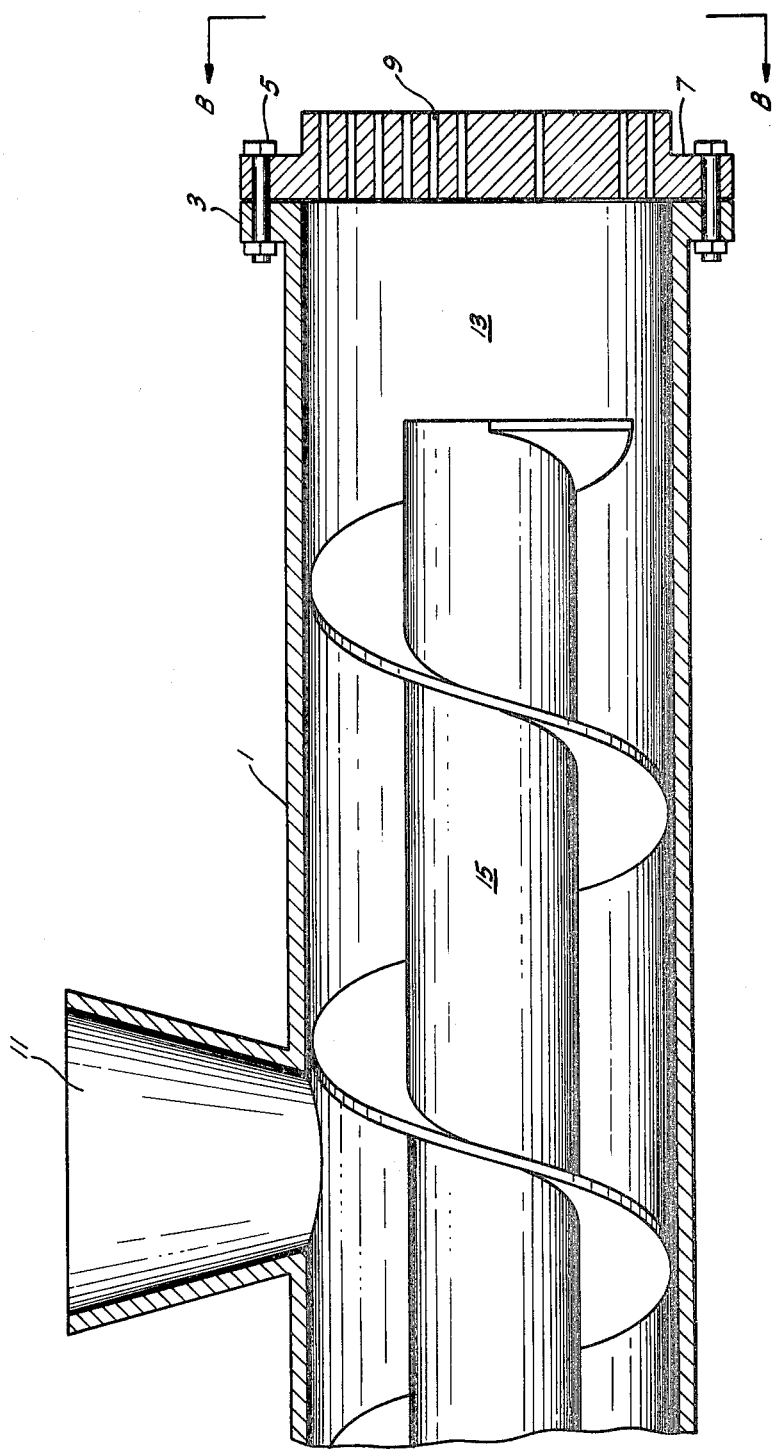
FIG. 1 is a fragmental, vertical, longitudinal section of an extrusion machine, shown in reduced size, which extrusion machine has incorporated therewith an extrusion die of the invention sectioned along A—A of FIG. 2.

Referring to FIG. 1 of the drawing, the end of an extruding machine comprises a casing 1 provided with a flange 3, through which bolts 5 secure a die 7 perforated by a plurality of cylindrical die orifices 9 of equal diameters. A feed opening 11 is formed in casing 1 for the introduction of catalyst mix materials into chamber 13 provided by casing 1 and die 7. Chamber 13 contains a helical feed screw 15, which, when suitably connected to a motor, not shown, is used to force the catalytic mix materials through chamber 13 longitudinally toward the inner face of die 7.

In operation, catalytic mix materials are fed into feed opening 11 wherefrom the helical feed screw 15, driven by the motor, forces the catalytic mix materials longitudinally through chamber 13 into the empty space of said chamber 13 situated between the terminus of the feed screw 15 and the inner face of die 7. The catalytic mix materials are subsequently extruded through die 7, and cylindrical extrudates are then cut by a conventional cutter, not shown, having a cutting blade which sweeps about an axis in a plane parallel to the external die face, but at a distance of at least 1/32 inch from said external die face.

The extrusion die 7 is preferably constructed so as to have flat, circular, internal and external die faces, or at least so as to have the centers of at least 15 outermost orifices define a circle, preferably of at least 2 inches in radius. The preferred extrusion die also has at least 50, most preferably at least 100, orifices therein. If the extrusion die is to be designed to produce catalyst extrudates, the orifices therein should, in the plane of the external die face, be of the same shape (i.e., circle, cloverleaf, elliptical, etc.) and of equivalent cross-sectional area, usually between about 0.02 and 0.10 in.$^2$. The orifices should also be similarly bored in the die, preferably so as to form either cylindrical or venturi-shaped passageways through the die.

To prevent the extrudates from being cut into nonuniform lengths by the cutter due to the difference in the rate of passage of extruded material through the central and circumferential portions of the die, orifices 9 are arranged in the die so that, on the external die face, the orifice density in a circle having an origin coincident with the center of said die face gradually increases as the circle is drawn to encompass more orifices. In accordance with the preferred embodiment of the invention, the orifices are arranged in the die such that, for any two concentric circles drawn on the die face about an origin coincident with the center of said die face, with the radii of both circles being of a length equal to 0.5 inch multiplied by a positive integer and the radius of the larger circle being no larger than that necessary to fully encompass all the orifices, the orifice density in the larger circle is greater than that of the smaller circle. Thus, in the preferred embodiment, every circle drawn on the die face that is of a radius equal to 0.5 inch multiplied by a positive integer greater than one, but being no larger than that necessary to define a circle encompassing all the orifices, has a greater orifice density than any smaller, concentric circle of radius equal to 0.5 inch multiplied by a positive integer. Also in accordance with the preferred embodiment, the orifice density in said first circle should be at least 0.1, preferably between 0.2 and 0.75 (on an orifice per square inch basis), greater than any defined second circle drawn within said first circle.

EXAMPLE I

Figure 2:
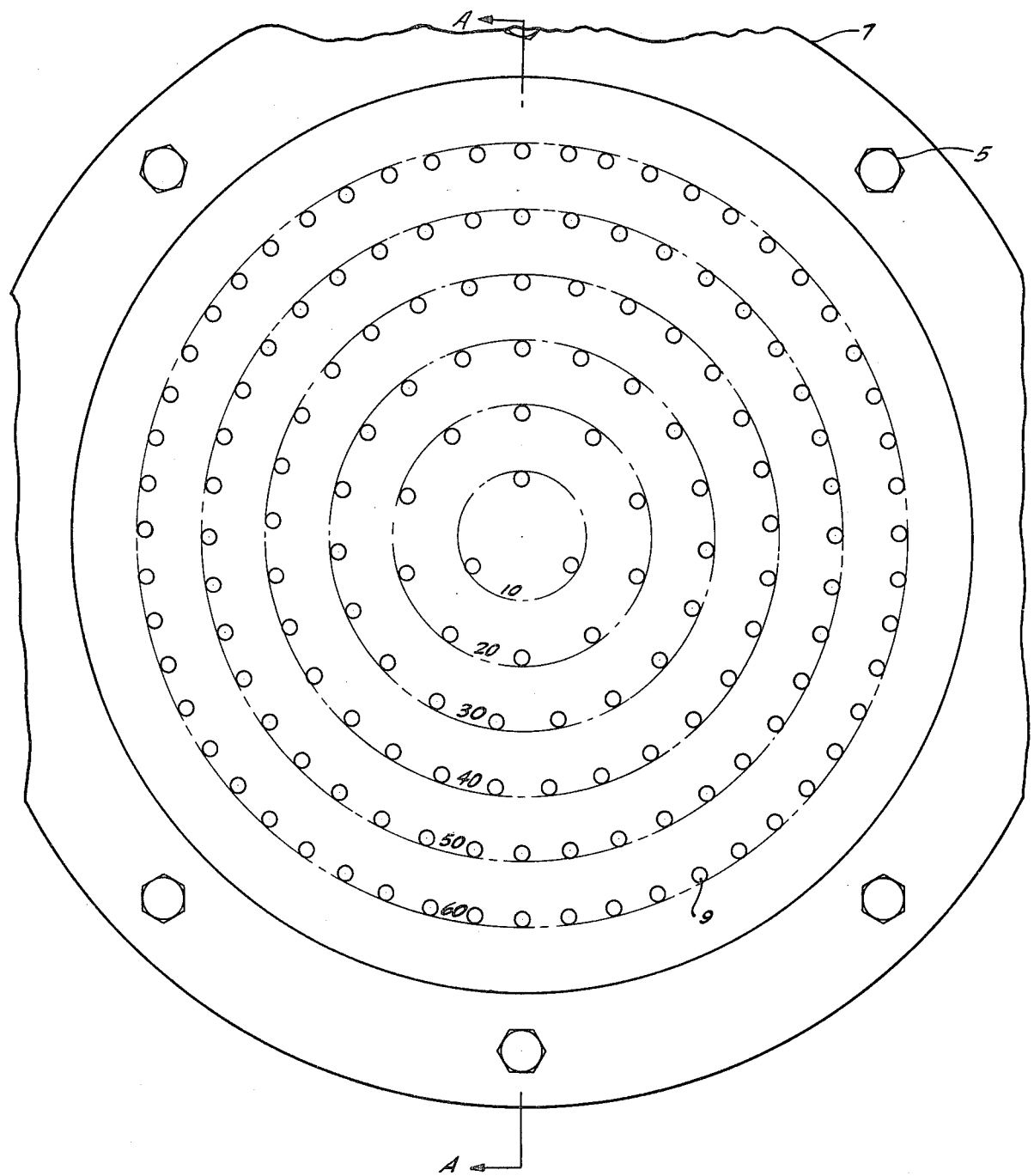
FIG. 2 is an end view taken along line B—B of FIG. 1, showing in actual size a 6.5 inch diameter external die face of a die having ⅛ inch diameter orifices arranged therein in accordance with the preferred embodiment of the invention.

An illustrative example of a die having orifices arranged therein according to the preferred embodiment is shown in FIG. 2. As shown, six concentric circles, 10, 20, 30, 40, 50, and 60, each having its origin at the center of the circular die face and being defined by a radius equal to 0.5 inch multiplied by a positive integer between one and six, have been drawn on the 6.5 inch diameter die face. One hundred fifty-three ⅛-inch diameter orifices have been arranged in the die so that the circumference of each orifice is coincident with the circumference of one of the circles 10 through 60, inclusive, at only one point. The coincident points of the orifices and circles 10–60 divide the circumferences of the respective circles into equal segments. The following Table I shows the pertinent data relevant to the areas defined by circles 10 through 60, inclusive.

TABLE I

| Circle | Radius (in.) | Area (in.$^2$) | Number of Encompassed Orifices | Orifice Density, #/in.$^2$ |
|---|---|---|---|---|
| 10 | 0.5 | .785 | 3 | 3.82 |
| 20 | 1.0 | 3.14 | 13 | 4.15 |
| 30 | 1.5 | 7.07 | 32 | 4.53 |
| 40 | 2.0 | 12.6 | 61 | 4.85 |
| 50 | 2.5 | 19.6 | 101 | 5.15 |
| 60 | 3.0 | 28.3 | 153 | 5.41 |

As shown in Table I, the orifice density increases for every larger circle drawn of radius equal to 0.5 inch multiplied by a positive integer, with the largest circle (i.e., circle 60) being no larger than that necessary to encompass all the orifices. In addition, each of the circles 20 through 60, inclusive, has an orifice density at least 0.25/in.$^2$ greater than any circle which it encloses, with the net effect being that there is more crowding of orifices near the circumference of the die face than at the center.

EXAMPLE II

Figure 3:
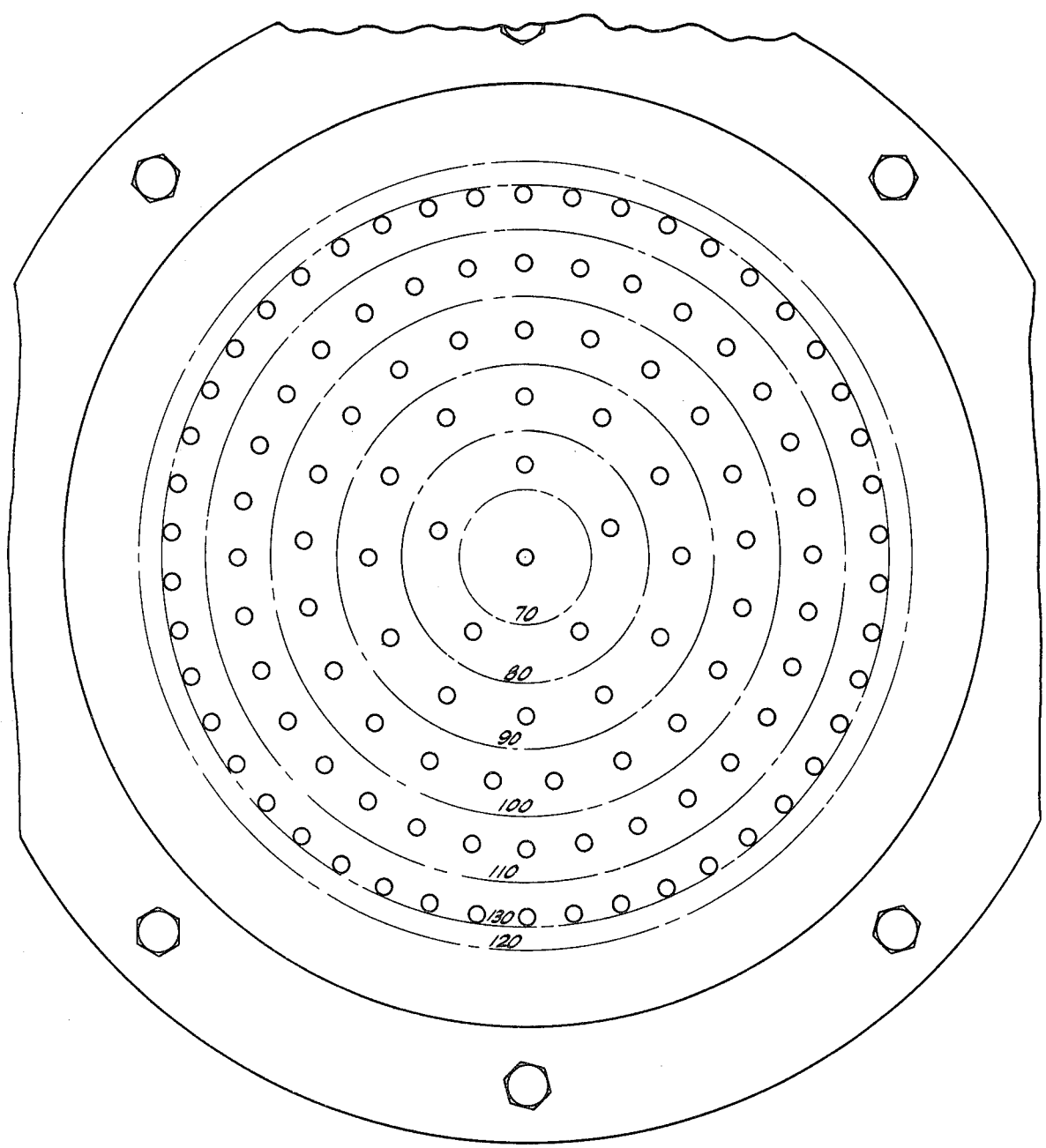
FIG. 3 shows the external die face of another die, of the same size as that shown in FIG. 2, but having ⅛ inch diameter orifices arranged differently than in FIG. 2, but still in accordance with the preferred embodiment.

An illustrative example of another die having orifices arranged therein according to the preferred embodiment is shown in FIG. 3. As shown, six concentric circles, 70, 80, 90, 100, 110, and 120, each having its origin at the center of the circular die face and being defined by a radius equal to 0.5 inch multiplied by a positive integer between one and six have been drawn on the 6.5 inch diameter die face. One hundred seventeen ⅛ inch diameter orifices have been arranged in the die so that the center of each orifice (except the one in the center) is on the circumference of one of five circles (not shown) of radii equal to: (0.5 inch times a positive integer) minus 0.25 inch. The centers of the orifices divide the circumference of the circles upon which their centers are situated into equal segments. In the following Table II the data relevant to the areas defined by circles 70 through 120, inclusive, are tabulated.

TABLE II

| Circle | Radius (in.) | Area (in.$^2$) | Number of Encompassed Orifices | Orifice Density #/in.$^2$ |
|---|---|---|---|---|
| 70 | 0.5 | .785 | 1 | 1.27 |
| 80 | 1.0 | 3.14 | 6 | 1.91 |
| 90 | 1.5 | 7.07 | 18 | 2.55 |
| 100 | 2.0 | 12.6 | 39 | 3.09 |
| 110 | 2.5 | 19.6 | 71 | 3.62 |
| 120 | 3.0 | 28.3 | 117 | 4.14 |

As shown in Table II, the orifice density in any circle is larger than that of any circle which it encloses. (This is even true for circle 120, which was drawn larger than that necessary to encompass the outermost orifices. Circle 110 is the largest circle drawn no larger than that necessary to encompass all the orifices but still be of radius equal to 0.5 inch multiplied by a positive integer greater than 1.) Each of the circles 70 through 110, inclusive, has an orifice density at least 0.5/in.$^2$ greater than any circle which it encloses. As with the embodiment shown in FIG. 2, more crowding of orifices occurs near the circumference of the die face than at the center thereof.

In alternative embodiments of the invention this same crowding effect is also produced, although not necessarily to the same degree as in the preferred embodiment. In one embodiment, the orifices are arranged in the die such that, for any first circle drawn on the die face so as to (a) have its origin at the center of the die face, (b) fully encompass no more than 90% of the orifices on said die face, and (c) be defined by a radius of 0.5 inch multiplied by a positive integer greater than 1, the orifice density of said first circle is larger than the orifice density in any concentric second circle of smaller radius, said smaller radius being of a length equal to 0.5 inch multiplied by a positive integer. Three other embodiments have similar orifice arrangements, with the only difference being that the first circle is defined by a radius of 9/16, ⅝, or ⅞ inch multiplied by a positive integer greater than 1 and the second circle is correspondingly defined by a radius of 9/16, ⅝, or ⅞ inch multiplied by a positive integer. It is also within the scope of the invention to arrange the orifices in the die so that, for any two concentric circles drawn on the die face with the center of said die face as origin, and with radii equal to 9/16, ⅜, or ⅝ inch times a positive integer, the larger circle will be of greater orifice density than the smaller circle, provided said larger circle is drawn no larger than that necessary to fully encompass all the orifices.

Preferably, in all embodiments of the invention, the orifice density in a circle drawn no larger than that necessary to fully encompass all the orifices (regardless of the dimension of the radius of said circle) is greater than the orifice density in any smaller circle of radius equal to a positive integer multiplied by 0.5, 9/16, ⅜, or ⅝ inch, as the case may be. For example, in FIG. 3, circle 130 is the circle drawn no larger than that necessary to fully encompass all the orifices. It is of radius equal to 2 13/16 inch, which is not a multiple of 0.5 inch. However, the orifice density of circle 130 is 4.7, which is larger than the orifice density of any of the enclosed circles 70 through 110.

As stated hereinbefore, the extrusion dies of the invention provide for the passage of material through all of the die orifices at a uniform or nearly uniform velocity. This is due to the arrangement of the orifices in the die. Because there are more orifices per unit area in the peripheral portions of the die than in its more central portions, the die offers less resistance to material being extruded through the peripheral orifices than through the central ones. And, since the material to be extruded through the die orifices is usually in laminar flow (and therefore has a parabolic velocity profile), that portion of the material which previously moved most rapidly now encounters higher resistance due to the presence of a low orifice density in the central die portion while the material which previously moved least rapidly encounters lower resistance in passing through the peripheral die portion of greater orifice density. Hence, the velocity profile of the extruded material flattens out, thereby allowing the material to flow out of all the die orifices at an essentially uniform velocity.

From the foregoing, it will be seen that the extrusion dies of the invention are particularly useful for making catalyst extrudates of the same size and shape. For example, a catalytic mix material, such as a mixture of ½% aqueous nitric acid and boehmite alumina ($Al_2O_3 \cdot H_2O$) in equal weight proportions, may be passed through an extrusion machine as hereinbefore described to produce streams of extruded material from the die. Because all the die orifices are of equivalent cross-sectional area and of the same shape in the die, and because the extruded material passes out of all the orifices at essentially the same linear velocity, a cutter operating at a suitable distance from the external die face will cut the extruded material into congruent pieces. The alumina extrudates so produced may then, by methods well known in the art, be impregnated with aqueous metallic solutions, such as those of nickel or cobalt nitrate, and then calcined so as to produce catalyst particles containing one or more metal components active for accelerating chemical reactions. And when used in the form of a packed bed of catalyst particles, the pressure drop of a gas or liquid flowing therethrough will be less than if the catalyst particles were of randomly different sizes.

Although the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An extrusion die having at least 50 orifices therein for the passage of extrudable material therethrough, said orifices being of equivalent cross-sectional area in the plane of the external die face and being arranged such that the orifice density in any first circle, drawn on said die face so that:
   (a) the center of said die face is the origin of said circle,
   (b) said circle encompasses no more than 90% of the orifices on said die face, and
   (c) said circle is defined by a radius of ⅝ inch multiplied by a positive integer greater than 1,
   is greater than the orifice density in any concentric second circle drawn on the die face of radius smaller than that of said first circle, but of length equal to ⅝ inch multiplied by a positive integer.

2. An extrusion die as defined in claim 1 wherein said die face is circular and said die contains at least 100 orifices.

3. An extrusion die as defined in claim 1 wherein said orifices, in the plane of the external die face, are of circular shape and of 0.02 – 0.10 in² cross-sectional area.

4. An extrusion die having at least fifty orifices therein for the passage of extrudable material therethrough, said orifices being of equivalent cross-sectional area in the plane of the external die face and being arranged such that the orifice density in any first circle, drawn on said die face so that:
   (a) the center of said die face is the origin of said circle,
   (b) said circle encompasses no more than 90% of the orifices on said die face, and
   (c) said circle is defined by a radius of 9/16 inch multiplied by a positive integer greater than 1,
   is greater than the orifice density in any concentric second circle drawn on the die face of radius smaller than that of said first circle, but of length equal to 9/16 inch multiplied by a positive integer.

5. An extrusion die as defined in claim 4 wherein said die face is circular and said die contains at least 100 orifices.

6. An extrusion die as defined in claim 4 wherein said orifices, in the plane of the external die face, are of circular shape and of 0.02 – 0.10 in² cross-sectional area.

7. An extrusion die having at least fifty orifices therein for the passage of extrudable material therethrough, said orifices being of equivalent cross-sectional area in the plane of the external die face and being arranged such that the orifice density in any first circle, drawn on said die face so that:
   (a) the center of said die face is the origin of said circle,
   (b) said circle encompasses no more than 90% of the orifices on said die face, and
   (c) said circle is defined by a radius of 0.5 inch multiplied by a positive integer greater than 1,
   is greater than the orifice density in any concentric second circle drawn on the die face of radius smaller than that of said first circle, but of length equal to 0.5 inch multiplied by a positive integer.

8. An extrusion die as defined in claim 7 wherein said die face is circular and said die contains at least 100 orifices.

9. An extrusion die as defined in claim 7 wherein said orifices, in the plane of the external die face, are of circular shape and of 0.02 – 0.10 in² cross-sectional area.

10. An extrusion die having at least fifty orifices therein for the passage of extrudable material therethrough, said orifices being of equivalent cross-sectional area in the plane of the external die face and being arranged such that the orifice density in any first circle, drawn on said die face so that:
   (a) the center of said die face is the origin of said circle,
   (b) said circle is no larger than that necessary to encompass all of the orifices on said die face, and
   (c) said circle is defined by a radius of 0.5 inch multiplied by a positive integer greater than 1,
   is greater than the orifice density in any concentric second circle drawn on the die face of radius smaller than that of said first circle, but of length equal to 0.5 inch multiplied by a positive integer.

11. An extrusion die as defined in claim 10 wherein said die face is circular and said die contains at least 100 orifices.

12. An extrusion die as defined in claim 10 wherein said orifices, in the plane of the external die face, are of circular shape and of 0.02 – 0.10 in² cross-sectional area.

13. An extrusion die having a plurality of orifices therein for the passage of extrudable material therethrough, said orifices being of equivalent cross-sectional area in the plane of the external die face and being arranged such that the orifice density in any first circle, drawn on said die face so that:
   (a) the center of said die face is the origin of said circle,
   (b) said circle encompasses no more than 90% of the orifices on said die face, and
   (c) said circle is defined by a radius of ¾ inch multiplied by a positive integer greater than 1,
   is greater than the orifice density in any concentric second circle drawn on the die face of radius smaller than that of said first circle, but of length equal to ¾ inch multiplied by a positive integer.

14. An extrusion die as defined in claim 13 wherein said die face is circular and said die contains at least 100 orifices.

15. An extrusion die as defined in claim 13 wherein said orifices, in the plane of the external die face, are of circular shape and of 0.02 – 0.10 in² cross-sectional area.

* * * * *

UNITED STATES PATENT OFFICE
CERTIFICATE OF CORRECTION

Patent No. 4,088,433   Dated May 9, 1978

Inventor(s) Howard D. Simpson

It is certified that error appears in the above-identified patent and that said Letters Patent are hereby corrected as shown below:

Column 8, line 4, (claim 13) delete "a plurality of" and insert therefor --at least fifty--.

Signed and Sealed this

Third Day of October 1978

[SEAL]

Attest:

RUTH C. MASON
Attesting Officer

DONALD W. BANNER
Commissioner of Patents and Trademarks